United States Patent
Ishikawa et al.

(10) Patent No.: US 12,524,223 B2
(45) Date of Patent: Jan. 13, 2026

(54) SOFTWARE MANAGEMENT SYSTEM, STORAGE MEDIUM, AND SOFTWARE UPDATE METHOD

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 18/341,178

(22) Filed: Jun. 26, 2023

(65) Prior Publication Data

US 2024/0069896 A1  Feb. 29, 2024

(30) Foreign Application Priority Data

Aug. 30, 2022  (JP) .................................. 2022-136589

(51) Int. Cl.
*G06F 8/60* (2018.01)
*G06F 8/65* (2018.01)
*H04L 67/06* (2022.01)
*H04L 67/12* (2022.01)

(52) U.S. Cl.
CPC ................ *G06F 8/65* (2013.01); *H04L 67/06* (2013.01); *H04L 67/12* (2013.01)

(58) Field of Classification Search
CPC . G06F 8/65; H04L 67/06; H04L 67/12; H04L 67/34
See application file for complete search history.

(56) References Cited

U.S. PATENT DOCUMENTS

| | | | |
|---|---|---|---|
| 2017/0118573 A1* | 4/2017 | Yae | ........................ H04W 4/50 |
| 2018/0048473 A1* | 2/2018 | Miller | ........................ H04L 9/30 |
| 2020/0174779 A1* | 6/2020 | David | ..................... G06F 8/654 |
| 2020/0371773 A1* | 11/2020 | Kato | .................. G01C 21/3885 |
| 2021/0026617 A1* | 1/2021 | Maru | ........................ G06F 8/65 |

FOREIGN PATENT DOCUMENTS

| | | | |
|---|---|---|---|
| JP | 2017-149323 A | 8/2017 | |
| JP | 2021-9658 A | 1/2021 | |
| JP | 2022-61381 A | 4/2022 | |
| JP | 2023-517387 A | 4/2023 | |
| JP | 7439720 B2 * | 2/2024 | ............... G06F 8/65 |

* cited by examiner

*Primary Examiner* — Hanh Thi-Minh Bui
(74) *Attorney, Agent, or Firm* — Oblon, McClelland, Maier & Neustadt, L.L.P.

(57) ABSTRACT

A software management system includes: a vehicle including a control device storing software and a display device; and a server including one or more processors that update the software by wireless communication. When a first error due to the server occurs, the one or more processors cancel software update and request the vehicle to display a description of the first error on the display device. When a second error different from the first error occurs, the vehicle cancels the software update, and displays a description of the second error on the display device without being requested by the one or more processors.

5 Claims, 6 Drawing Sheets

SOFTWARE MANAGEMENT SYSTEM, STORAGE MEDIUM, AND SOFTWARE UPDATE METHOD

CROSS-REFERENCE TO RELATED APPLICATION

This application claims priority to Japanese Patent Application No. 2022-136589 filed on Aug. 30, 2022, incorporated herein by reference in its entirety.

BACKGROUND

1. Technical Field

The present disclosure relates to software management systems, storage media, and software update methods.

2. Description of Related Art

Over-The-Air (OTA) technology for updating software (vehicle control programs) stored in a control device (electronic control unit (ECU)) for a vehicle through wireless communication has been studied and developed. For example, Japanese Unexamined Patent Application Publication No. 2017-149323 (JP 2017-149323 A) discloses a vehicle control system capable of safely updating software without impairing user convenience. When it is determined that an electronic key of a vehicle is located inside the vehicle, a mobile device sends a signal requesting a download of update software to a server. An ECU downloads, via the mobile device, the update software sent from the server and updates the software.

SUMMARY

If an error occurs during a software update (hereinafter also referred to as "campaign"), it is desirable to cancel the software update and notify the user of the reason for the cancellation. A campaign can be canceled due to various errors (reasons). More specifically, a campaign can be canceled due to an error caused by a server sending software (OTA center that will be described later), or can be canceled due to an error caused by a vehicle receiving software. It is desirable to properly cancel a campaign and properly notify the user of the reason for the cancellation.

The present disclosure provides a software management system capable of properly canceling a campaign and properly notifying the user of the reason for the cancellation.

(1) A software management system according to an aspect of the present disclosure includes: a vehicle including a control device storing software and a display device; and a server including one or more processors configured to update the software by wireless communication. The one or more processors are configured to, when a first error due to the server occurs, cancel software update and request the vehicle to display a description of the first error on the display device. The vehicle is configured to, when a second error different from the first error occurs, cancel the software update, and display a description of the second error on the display device without being requested by the one or more processors.

(2) The first error may include at least one of (i) expiration of a warranty period for operation of the software in the vehicle and (ii) an issue of downloading the software from the server to the vehicle.

(3) The one or more processors may be configured to, when the software update is canceled due to the first error and the server and the vehicle are not communicable with each other, notify equipment that is operable by a user of the vehicle of the first error.

(4) The second error may include at least one of (i) an issue of installing or activating the software in the vehicle, (ii) poor wireless connection between the server and the vehicle, and (iii) expiration of a validity period during which the software is updatable.

(5) The vehicle may be configured to, when the software update is canceled due to the second error, display on the display device how to retry the software update or when to update the software.

In the configurations of (1) to (5), when the first error due to the server occurs, the server cancels the software update, and the vehicle displays the description of the first error according to the request from the server. This makes it possible to take action according to the intention of the server of a software development company etc. For example, even if the vehicle tries to proceed with the software update, the vehicle is not allowed to proceed any further. On the other hand, when the second error other than the first error occurs, the vehicle cancels the software update and displays the description of the second error. This can reduce the vehicle management cost for the server (cost for the server to determine the reason for the cancellation and to send a request to the vehicle). Moreover, even when the vehicle is in an environment in which wireless connection is not available, it is possible to notify the user.

(6) A non-transitory storage medium according to another aspect of the present disclosure stores instructions that are executable by one or more processors of a server and one or more processors of a vehicle. The instructions cause the one or more processors to perform functions. The functions include: when a first error due to the server occurs, canceling a software update on a control device of the vehicle by the one or more processors of the server, and requesting the vehicle to display a description of the first error on a display device by the one or more processors of the server; and when a second error different from the first error occurs, canceling the software update by the vehicle, and displaying a description of the second error on the display device by the vehicle without being requested by the one or more processors of the server.

(7) A software update method according to still another aspect of the present disclosure updates software on a control device of a vehicle though wireless communication. The software update method includes: when a first error due to a server occurs, canceling the software update by one or more processors of the server, and requesting the vehicle to display a description of the first error on a display device by the one or more processors; and when a second error different from the first error occurs, canceling the software update by the vehicle, and displaying a description of the second error on the display device by the vehicle without being requested by the one or more processors.

According to the non-transitory storage medium of (6) and the method of (7), a campaign can be properly canceled, and the reason for the cancellation can be properly notified, as in the configuration of (1).

According to the present disclosure, a software update (campaign) is properly canceled and the reason for the cancellation is properly notified to the user. Therefore, the reason for the cancellation can be notified to the user in an appropriate manner.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same or corresponding parts are denoted by the same signs throughout the drawings, and description thereof will not be repeated.

Embodiment

System Configuration

Figure 1:
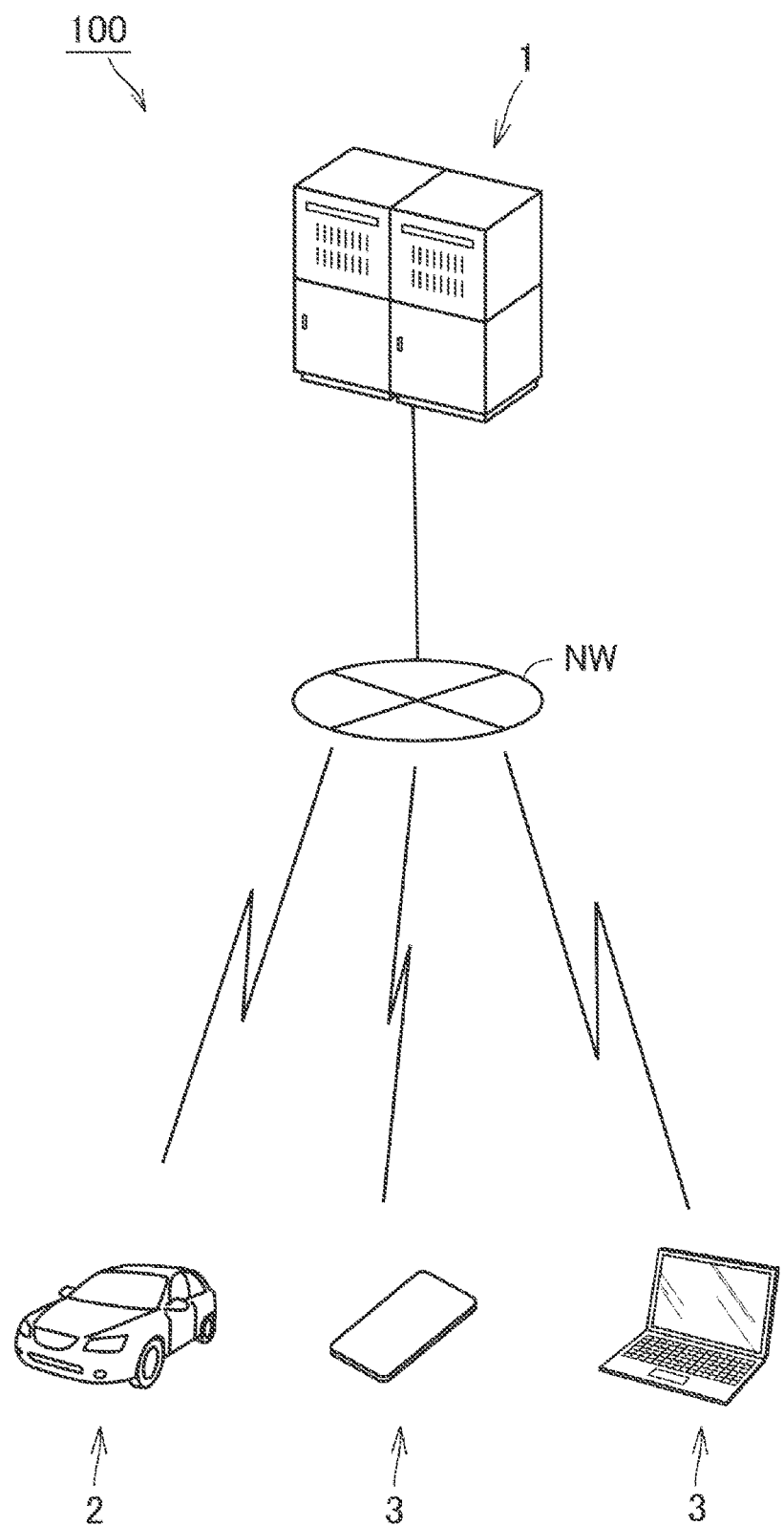
FIG. 1 shows a schematic configuration of a software management system according to an embodiment of the present disclosure.

FIG. 1 shows a schematic configuration of a software management system according to an embodiment of the present disclosure. A software management system 100 includes an OTA center 1, a vehicle 2, and user equipment (UE) 3. The OTA center 1 is connected to the vehicle 2 and the user equipment 3 via a network NW so that the OTA center 1 can communicate with the vehicle 2 and the user equipment 3.

The OTA center 1 is a server that provides software for ECUs (see FIG. 3) mounted on the vehicle 2. The OTA center 1 is managed by, for example, a vehicle manufacturer that manufactures a vehicle platform (VP). The configuration of the OTA center 1 will be described later with reference to FIG. 2.

The vehicle 2 is managed by a user. The user is typically an individual, but may be, for example, a cooperate body that conducts business using the vehicle 2 (a transport operator etc.). The vehicle 2 may be an autonomous vehicle. In this case, the OTA center 1 may be managed by a manufacturer of an autonomous driving system (ADS) (see FIG. 3) mounted on the VP, instead of or in addition to the vehicle manufacturer. The vehicle 2 may be a vehicle that can only be manually driven and that does not support autonomous driving. The configuration of the vehicle 2 will be described later with reference to FIG. 3.

The user equipment 3 is equipment that is operated by the user of the vehicle 2. The user equipment 3 may be mobile equipment or stationary equipment. Examples of the mobile equipment include smartphones, tablets, notebook personal computers (PCs), and wearable devices (smartwatches etc.). Examples of the stationary equipment include desktop PCs. The configuration of the user equipment 3 will be described later with reference to FIG. 4.

Although only one vehicle 2 is shown in FIG. 1 due to space limitations, the software management system 100 may include any number of vehicles 2. The software management system 100 typically includes a large number of vehicles 2. The same applies to the user equipment 3.

Figure 2:
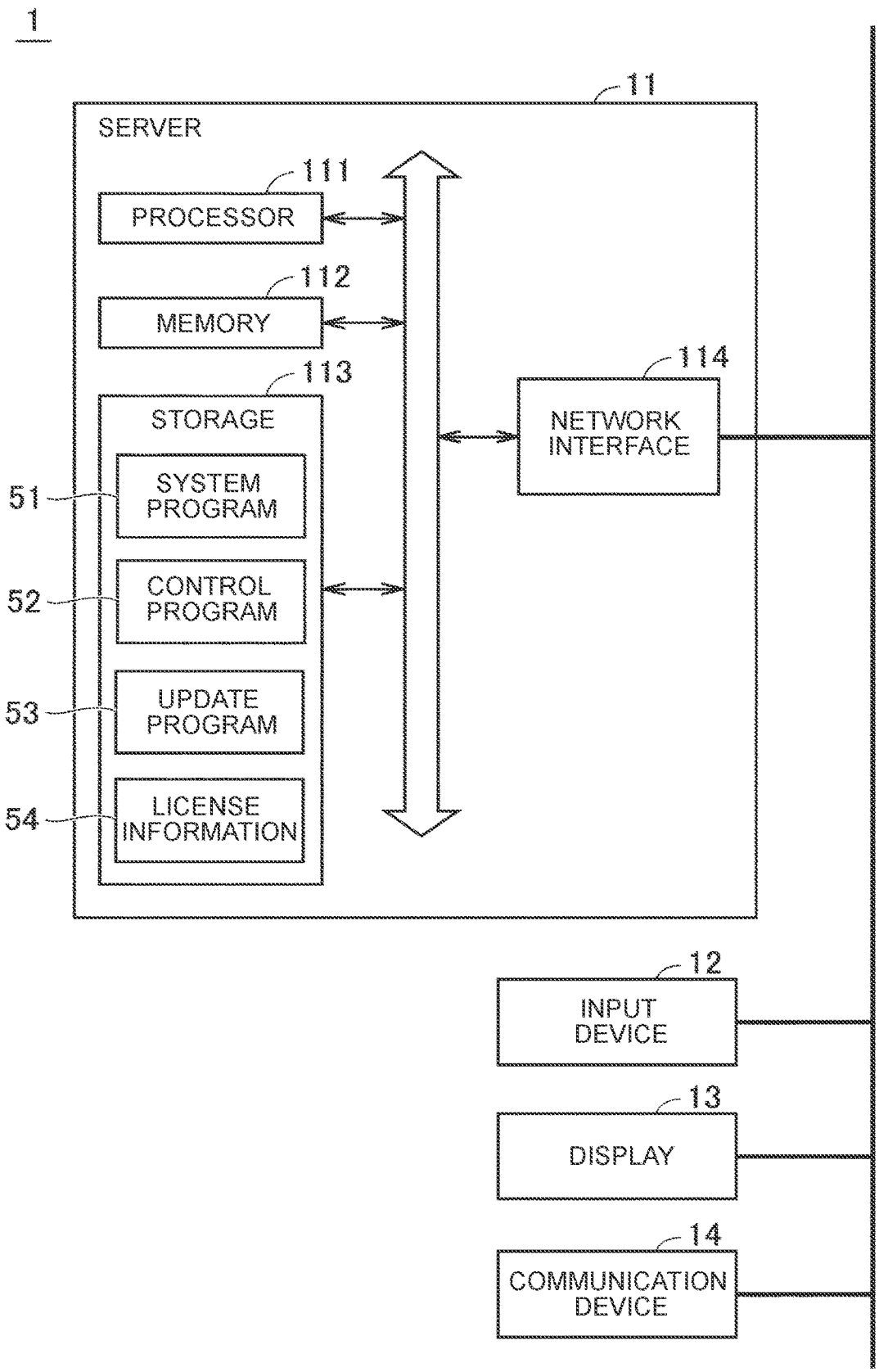
FIG. 2 is a block diagram showing a typical configuration example of an OTA center.

FIG. 2 is a block diagram showing a typical configuration example of the OTA center 1. The OTA center 1 includes a server 11, an input device 12, a display 13, and a communication device 14. The server 11 includes a processor 111, a memory 112, a storage 113, and a network interface 114. The components of the OTA center 1 are connected to each other via a communication bus.

The storage 113 is a rewritable nonvolatile memory such as a hard disk drive (HDD), a solid state drive (SSD), or a flash memory. The storage 113 stores: a system program 51 including an operating system (OS); a control program 52 including computer-readable codes necessary for control calculations; an update program 53 for updating control programs for the vehicle 2; and license information 54 for obtaining user's approval to a download, installation, etc. of the update program 53. The processor 111 is, for example, a central processing unit (CPU) or a micro-processing unit (MPU). The processor 111 reads the system program 51 and the control program 52, loads them into the memory 112, and executes them to implement various processes. The network interface 114 controls data communication that is performed between the server 11 and other devices (vehicle 2, user equipment 3, etc.) via the communication device 14. As will be described in detail later, a notification of the reason for cancellation of a software update (campaign) is also output from the network interface 114 to the user (vehicle 2 and/or user equipment 3).

The input device 12 is a keyboard, a mouse, etc. and receives input from an operator of the server 11. The display 13 displays various kinds of information to the operator of the server 11.

Although FIG. 2 shows an example in which the server 11 includes one processor 111, the server 11 may include a plurality of processors. That is, the server 11 includes one or more processors. The same applies to the memory 112 and the storage 113.

As used herein, the "processor" is not limited to a processor in a narrow sense that performs processes in a stored-program mode, and may include hardwired circuits such as application specific integrated circuits (ASICs) and field-programmable gate arrays (FPGAs). Therefore, the term "processor" may be read as processing circuitry whose processes are defined in advance by computer-readable codes and/or hardwired circuits.

Figure 3:
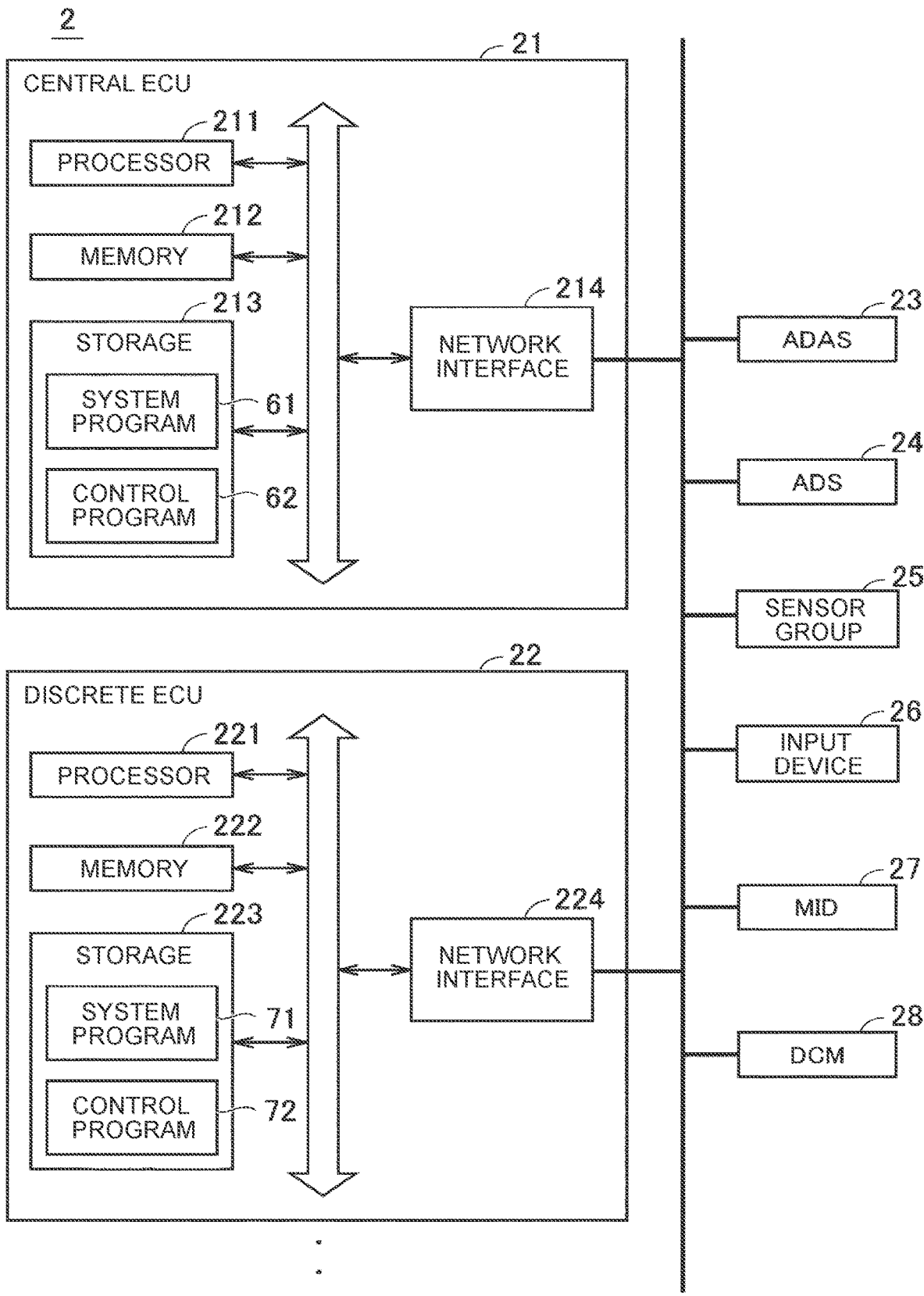
FIG. 3 is a block diagram showing a typical configuration example of a vehicle.

FIG. 3 is a block diagram showing a typical configuration example of the vehicle 2. The vehicle 2 includes a central ECU 21, a plurality of discrete ECUs 22, advanced driver-assistance systems (ADAS) 23, an ADS 24, a sensor group 25, an input device 26, a Multi-Information Display (MID) 27, and a Data Communication Module (DCM) 28. The discrete ECUs 22 are separate ECUs for each feature, and include, for example, a brake ECU, a steering ECU, a motor generator ECU, and a body ECU. The discrete ECUs 22 may be controllers storing software for implementing features of the ADAS 23 and/or the ADS 24. The components of the vehicle 2 are connected to each other via a wired in-vehicle network such as a controller area network (CAN) or in-vehicle Ethernet (registered trademark).

The basic configurations of the central ECU 21 and the discrete ECUs 22 are similar to the configuration of the server 11. A storage 223 of each discrete ECU 22 stores software (system program 71 and control program 72) that is executed by a processor 221 of the discrete ECU 22. Each discrete ECU 22 controls a system corresponding to the discrete ECU 22 so that the vehicle 2 goes into a desired state according to signals from the sensor group 25 etc. As used herein, the system may include a braking system, a steering system, a powertrain system, a body system, etc., none of which are shown.

A processor 211 of the central ECU 21 controls update processes of software stored in the storages 223 of the discrete ECUs 22. The central ECU 21 receives (downloads) software from the OTA center 1 via the DCM 28, and stores (installs) the downloaded software in the storage 223 of the discrete ECU 22 at an appropriate timing. The central ECU 21 then activates the installed software at an appropriate timing.

The ADAS 23 includes, for example, Adaptive Cruise Control (ACC), Auto Speed Limiter (ASL), Lane Keeping Assist (LKA), Pre-Crash Safety (PCS), and Lane Departure Alert (LDA). The ADS 24 is configured to perform autonomous driving of the vehicle 2.

The sensor group 25 includes sensors configured to detect the surroundings of the vehicle 2. The sensor group 25 further includes sensors configured to detect information according to the driving state of the vehicle 2 and detect a steering operation, an accelerator operation, and a brake operation (none of such sensors are shown). Specifically, the sensor group 25 may include, for example, a camera, a radar, a Laser Imaging Detection and Ranging (LIDAR), a vehicle speed sensor, an acceleration sensor, a yaw rate sensor, and a steering sensor (none of which are shown).

The input device 26 is, for example, a touch panel provided on the MID 27. The input device 26 may be a physical switch or button. The MID 27 is a display on which, for example, map information, vehicle management information, etc. are displayed. An instrument panel, not shown, is also used as a human-machine interface (HMI). The DCM 28 is an in-vehicle communication module. The DCM 28 is configured to allow two-way data communication between the central ECU 21 and the server 11.

Figure 4:
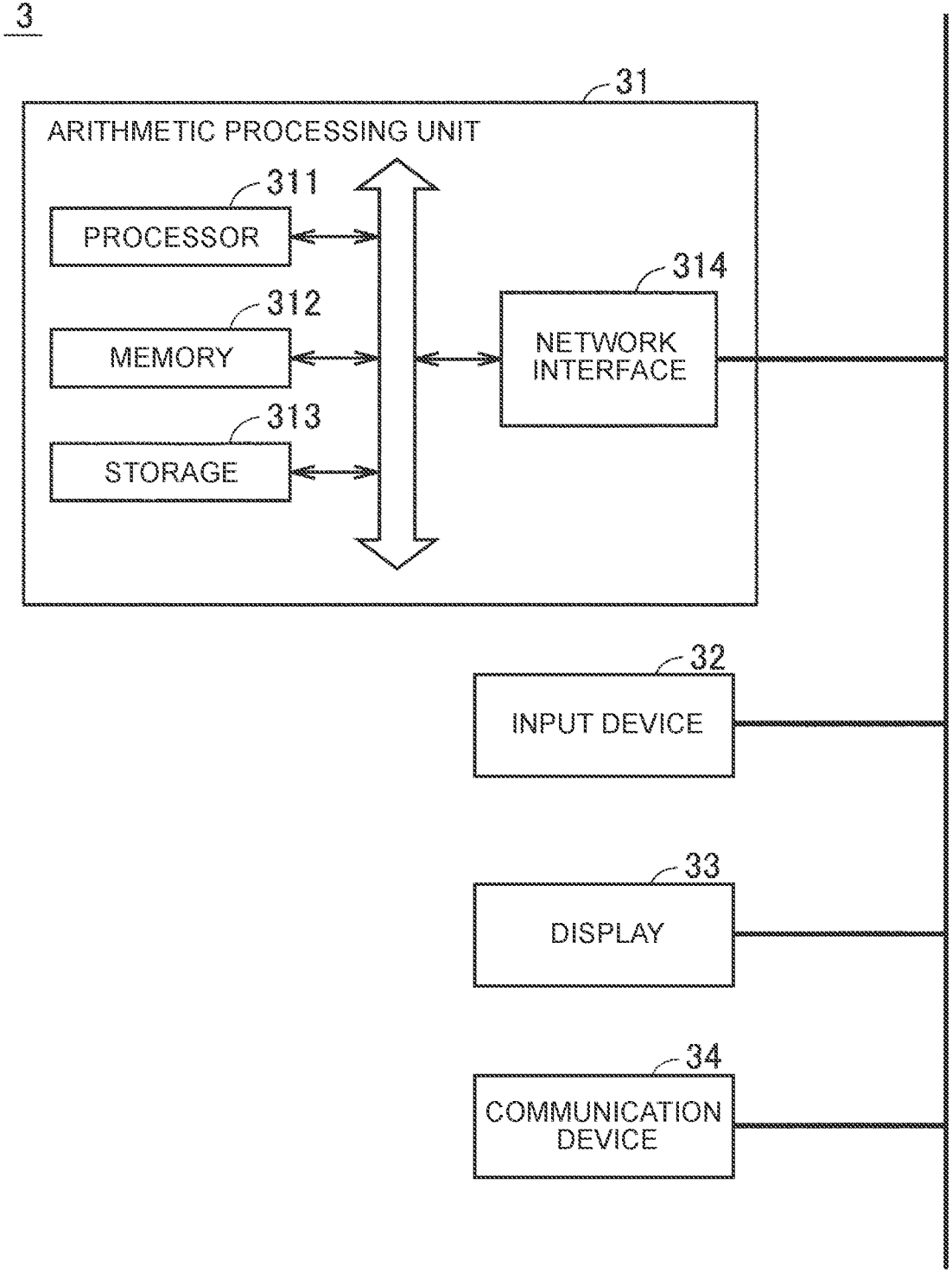
FIG. 4 is a block diagram showing a typical configuration example of user equipment.

FIG. 4 is a block diagram showing a typical configuration example of the user equipment 3. The user equipment 3 includes an arithmetic processing unit 31, an input device 32, a display 33, and a communication device 34. The input device 32 and the display 33 are configured as an integrated unit such as a touch panel display. However, the input device 32 may be a dedicated input device (keyboard, mouse, etc.), and the display 33 may be a stationary monitor. Other configurations of the user equipment 3 are similar to the configurations of the server 11 (see FIG. 2).

Cancellation of Campaign

When a software update (campaign) is canceled, the cancellation is notified to the user. More specifically, a campaign can be canceled for a reason due to the OTA center 1 sending software, or can be canceled for a reason due to the vehicle 2 receiving software. It is desirable to properly notify the user of the reason for the cancellation of the campaign.

Therefore, in the present embodiment, the mode of notification to the user is switched according to the reason for the cancellation of the campaign. More specifically, when the reason for the cancellation of the campaign is a first error caused by the OTA center 1, the OTA center 1 notifies the user of the reason for the cancellation (description of the first error) via the vehicle 2. When the reason for the cancellation of the campaign is a second error different from the first error, the vehicle 2 notifies the user of the reason for the cancellation (description of the second error).

"Notifying the user of the reason for the cancellation" means displaying the reason for the cancellation on the MID 27 (or instrument panel) of the vehicle 2, or sending the content to be displayed from the OTA center 1 to the vehicle 2 to display it on the MID 27. However, as will be described later, the reason for the cancellation may be notified to the user equipment 3. Specific examples of the first and second errors will be described below.

First Error

The first error may include at least one of the following errors A, B.

(A) Expiration of Warranty Period

A software developer sets a warranty period (e.g., several months to several years) for new update software. The warranty period is a period during which the software developer warrants the operation of the software. Typically, hardware of a vehicle is more likely to fail or to be replaced (modified) over time. Accordingly, after the warranty period expires, a situation may arise in which the software does not operate normally due to a failure of the hardware, a mismatch between the hardware and the software, etc. Therefore, the campaign is canceled. When the warranty period has expired, the campaign is canceled based on the determination of the software developer because, for example, the software developer cannot warrant the proper operation of the software and it is preferable not to use excessively old features. In this case, the OTA center 1 cancels the campaign and notifies the vehicle 2 of the reason for the cancellation that the warranty period has expired.

(B) Download Issue

An error (e.g., a timeout) may occur while the vehicle 2 is downloading software from the OTA center 1. Since the OTA center 1 can detect this error, the OTA center 1 notifies the vehicle 2 of the reason for the cancellation that the error has occurred during download.

Second Error

The second error may include at least one of the following errors C, D, and E.

(C) Installation/Activation Issue

An error may occur during the process of installing downloaded software in the storage 223 of the discrete ECU 22, or an error may occur during the process of activating installed software. Since the installation and activation are performed in the vehicle 2 (central ECU 21 and/or discrete ECU 22), it is suitable that the vehicle 2 detect these errors. Therefore, if an error occurs during the installation/activation in the vehicle 2, the vehicle 2 cancels the campaign and notifies the reason for the cancellation (displays the reason for the cancellation on the MID 27 etc.).

(D) Poor Wireless Connection

Wireless connection between the OTA center 1 and the vehicle 2 may become poor when, for example, the vehicle 2 is parked in an underground parking lot or behind a large building. In such a case, it is difficult to send information (command/notification) from the OTA center 1 to the vehicle 2. Therefore, the vehicle 2 cancels the campaign and notifies that the reason for the cancellation is poor wireless connection.

(E) Expiration of Validity Period

A validity period is set for a campaign. The validity period is a period given from the start of a download (or after a download becomes available) to the completion of activation, and is, for example 10 days. Both the OTA center 1 and the vehicle 2 can calculate whether the validity period has expired. However, since the OTA center 1 manages a large number of vehicles 2, the computational load (management cost) for the OTA center 1 to manage the validity periods for all the vehicles 2 can become large. The management cost for the OTA center 1 can be reduced by determining whether the validity period has expired by each vehicle 2. Therefore, the vehicle 2 notifies the user of the reason for the cancellation that the validity period has expired.

Process Flow

Process by OTA Center

Figure 5:
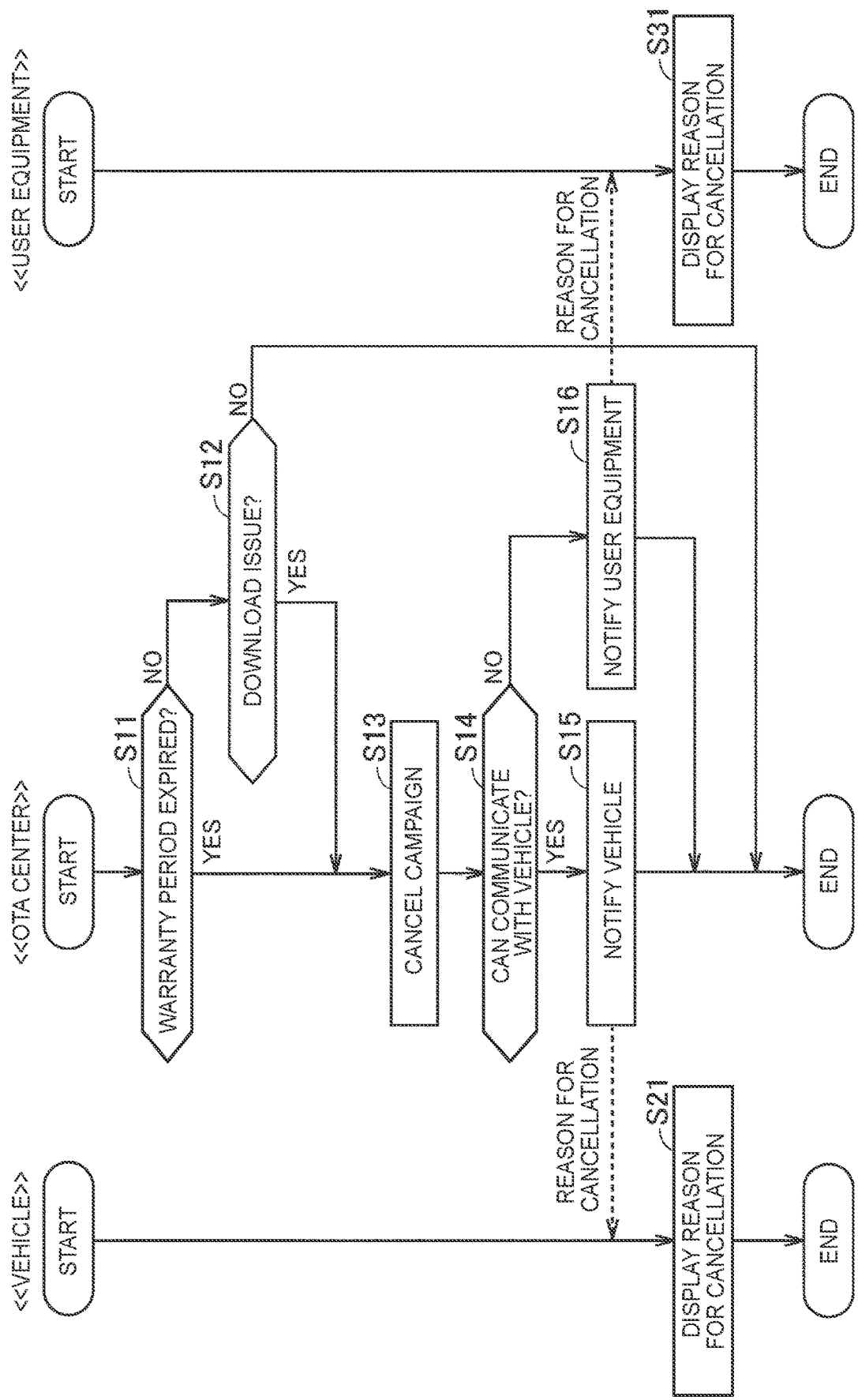
FIG. 5 is a flowchart of a process of canceling a campaign by the OTA center.

FIG. 5 is a flowchart of a process of canceling a campaign by the OTA center 1. The steps in this flowchart are performed when a predetermined condition is satisfied (e.g., in predetermined cycles). Each step is typically implemented by software processing by the server 11 (processor 111) of the OTA center 1, but may be implemented by hardware (electrical circuitry) in the server 11. Hereinafter, the term "step" is abbreviated as "S."

In S11, the OTA center 1 determines whether an error due to expiration of the warranty period (error A) has occurred. When the warranty period has elapsed (YES in S11), the process proceeds to S13. When the warranty period has not elapsed (NO in S11), the process proceeds to S12.

In S12, the OTA center 1 determines whether an error due to a download issue (error B) has occurred. When a download issue has occurred (YES in S12), the process proceeds to S13. When no download issue has occurred (NO in S12), the OTA center 1 ends the series of steps. The order of steps S11, S12 can be reversed.

In S13, the OTA center 1 cancels the campaign. The OTA center 1 then determines whether the OTA center 1 and the vehicle 2 can wirelessly communicate with each other (S14). When the OTA center 1 and the vehicle 2 can wirelessly communicate with each other (YES in S14), the OTA center 1 notifies the vehicle 2 of the reason for the cancellation of the campaign (either the error A or B) (S15). That is, the OTA center 1 requests the vehicle 2 to display a description of the reason for the cancellation of the campaign on the MID 27. The vehicle 2 displays a description of the error A or B on the MID 27 according to this request (S21).

On the other hand, when the OTA center 1 and the vehicle 2 cannot wirelessly communicate with each other due to a communication failure etc. (NO in S14), the OTA center 1 notifies the user equipment 3 of the reason for the cancellation of the campaign (error A or B) (S16). The user equipment 3 displays a description of the error A or B on the display 33 according to the notification (request) from the OTA center 1 (S31).

Process by Vehicle

Figure 6:
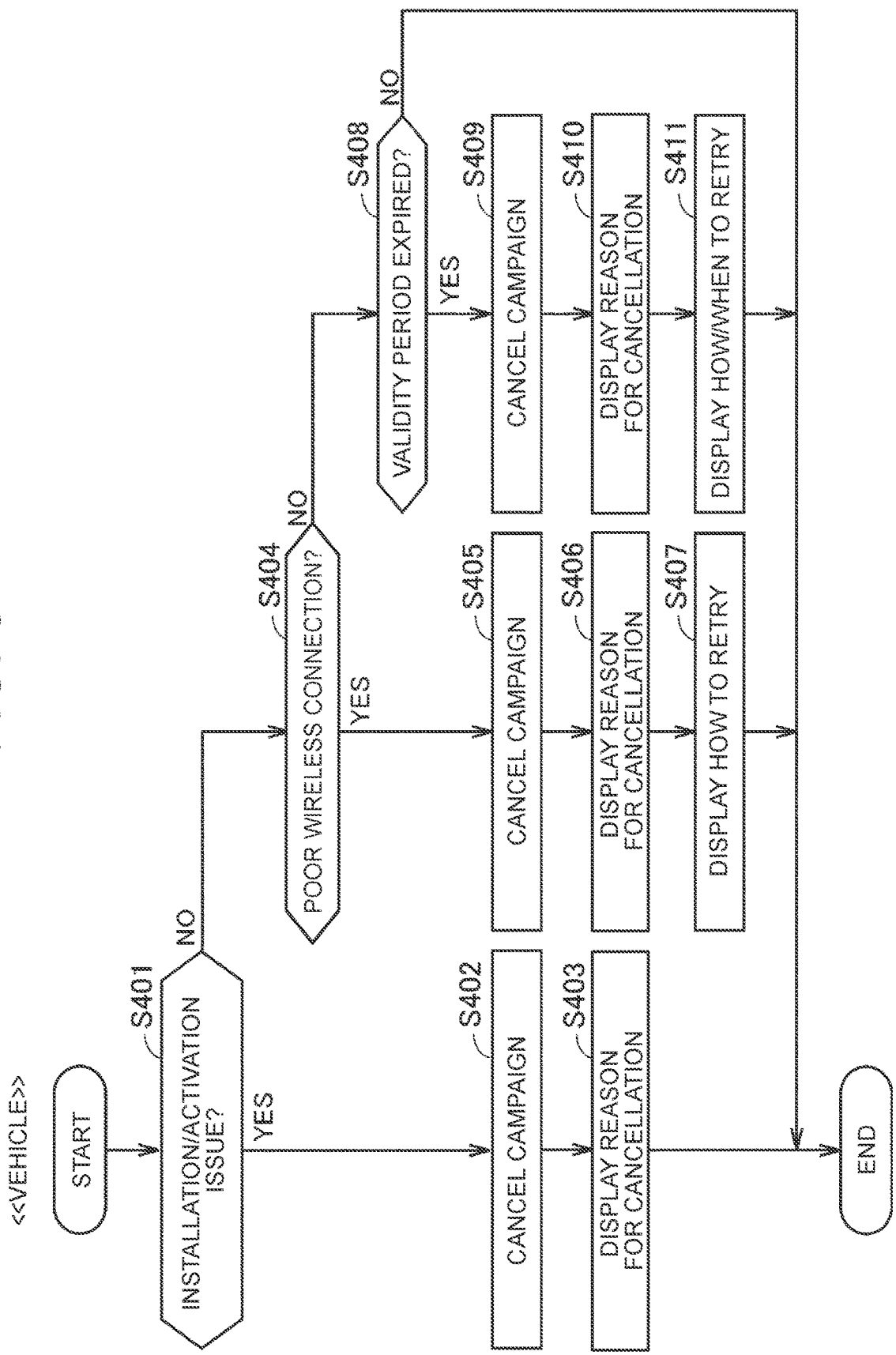
FIG. 6 is a flowchart of a process of canceling a campaign by the vehicle.

FIG. 6 is a flowchart of a process of canceling a campaign by the vehicle 2. The steps in this flowchart are also performed when a predetermined condition is satisfied (e.g., in predetermined cycles). Each step is typically implemented by software processing by the discrete ECU 22 (processor 221) of the vehicle 2, but may be implemented by hardware (electrical circuitry) in the discrete ECU 22.

In S401, the vehicle 2 determines whether an error due to an installation/activation issue (error C) has occurred. When an installation/activation issue has occurred (YES in S401), the process proceeds to S402, and the vehicle 2 cancels the campaign. The vehicle 2 also displays on the MID 27 that the reason for the cancellation of the campaign is an installation/activation issue (S403).

When no error due to an installation/activation issue has occurred (NO in S401), the process proceeds to S404.

In S404, the vehicle 2 determines whether an error due to poor wireless connection (error D) has occurred. When an error due to poor wireless connection has occurred (YES in S404), the process proceeds to S405, and the vehicle 2 cancels the campaign. The vehicle 2 also displays on the MID 27 that the reason for the cancellation of the campaign is poor wireless connection (S406). The vehicle 2 may also display how to retry the campaign on the MID 27 (S407). More specifically, the vehicle 2 may display on the MID 27 a message prompting to move to a location where wireless connection can be improved (aboveground, an open area, etc.). The user can thus take measures to improve wireless connection.

When no error due to poor wireless connection has occurred (NO in S404), the process proceeds to S408.

In S408, the vehicle 2 determines whether an error due to expiration of the validity period (error E) has occurred. When an error due to expiration of the validity period has occurred (YES in S408), the process proceeds to S409, and the vehicle 2 cancels the campaign. The vehicle 2 also displays on the MID 27 that the reason for the cancellation of the campaign is expiration of the validity period (S410). The vehicle 2 may also display on the MID 27 how and/or when to retry the campaign (S411). For example, the vehicle 2 may display on the MID 27 a message telling that the campaign must be completed before the validity period expires, may display on the MID 27 a message prompting to retry the campaign (prompting to perform an operation to give approval to the software update, etc.), or may display on the MID 27 the validity period of the next campaign. The user can thus perform necessary operations while being aware of the validity period.

When no error due to expiration of the validity period has occurred (NO in S408), the vehicle 2 ends the series of steps. The order of steps S401, S404, and S408 can be changed as appropriate. The reason for the cancellation may be displayed on the display 33 of the user equipment 3 instead of or in addition to the MID 27 of the vehicle 2.

As described above, in the present embodiment, when the first error (error A or B) due to the OTA center 1 occurs, the OTA center 1 cancels the campaign, and the vehicle 2 displays the description of the first error according to the request from the OTA center 1. This makes it possible to take action according to the intention of the OTA center 1 (software development company etc.). For example, even if the vehicle 2 tries to proceed with the campaign, the vehicle 2 is not allowed to proceed any further. On the other hand, when the second error (error C, D, or E) other than the first error occurs, the vehicle 2 stops the campaign and displays the description of the second error. This can reduce the cost for the OTA center 1 to manage the large number of vehicles 2. Moreover, even when the vehicle 2 is in an environment in which wireless connection is not available, it is possible to notify the user.

The embodiment disclosed herein should be construed as illustrative in all respects and not restrictive. The scope of the present disclosure is shown by the claims rather than by the above description of the embodiment and is intended to include all modifications within the scope equivalent to the claims.

What is claimed is:

1. A software management system comprising:
   a vehicle including a control device storing software and a display device; and
   a server including one or more processors configured to update the software by wireless communication, wherein
   the one or more processors are configured to, when a first error due to the server occurs, cancel software update and request the vehicle to display a description of the first error on the display device, the one or more processors are configured to, when the software update is canceled due to the first error and the server and the vehicle are not communicable with each other, notify a user equipment associated with a user of the vehicle of the first error, the vehicle is configured to, when a second error different from the first error occurs, cancel the software update, and display a description of the second error on the display device without being requested by the one or more processors, the second error includes at least one of (i) an issue of installing or activating the software in the vehicle, (ii) poor wireless connection between the server and the vehicle, and (iii) expiration of a validity period during which the software is updatable, and the server is configured to determine whether (i) the first error due to the server occurs or (ii) the second error including at least one of the poor wireless connection between the server and the vehicle and the expiration of the validity period during which the software is updatable occurs.

2. The software management system according to claim 1, wherein the first error includes at least one of (i) expiration of a warranty period for operation of the software in the vehicle and (ii) an issue of downloading the software from the server to the vehicle.

3. The software management system according to claim 1, wherein the vehicle is configured to, when the software update is canceled due to the second error, display on the display device how to retry the software update or when to update the software.

4. A non-transitory computer-readable storage medium storing instructions that are executable by one or more processors of a server and one or more processors of a vehicle and that cause the one or more processors to perform functions comprising:

when a first error due to the server occurs, canceling a software update on a control device of the vehicle by the one or more processors of the server, and requesting the vehicle to display a description of the first error on a display device by the one or more processors of the server;

when the software update is canceled due to the first error and the server and the vehicle are not communicable with each other, notifying, by the one or more processors of the server, a user equipment associated with a user of the vehicle of the first error;

when a second error different from the first error occurs, canceling the software update by the vehicle, and displaying a description of the second error on the display device by the vehicle without being requested by the one or more processors of the server, wherein the second error includes at least one of (i) an issue of installing or activating the software in the vehicle, (ii) poor wireless connection between the server and the vehicle, and (iii) expiration of a validity period during which the software is updatable; and determining whether (i) the first error due to the server occurs or (ii) the second error including at least one of the poor wireless connection between the server and the vehicle and the expiration of the validity period during which the software is updatable occurs.

5. A software update method for updating software on a control device of a vehicle though wireless communication, the method comprising:

when a first error due to a server occurs, canceling the software update by one or more processors of the server, and requesting the vehicle to display a description of the first error on a display device by the one or more processors;

when the software update is canceled due to the first error and the server and the vehicle are not communicable with each other, notifying, by the one or more processors of the server, a user equipment associated with a user of the vehicle of the first error;

when a second error different from the first error occurs, canceling the software update by the vehicle, and displaying a description of the second error on the display device by the vehicle without being requested by the one or more processors, wherein the second error includes at least one of (i) an issue of installing or activating the software in the vehicle, (ii) poor wireless connection between the server and the vehicle, and (iii) expiration of a validity period during which the software is updatable; and determining whether (i) the first error due to the server occurs or (ii) the second error including at least one of the poor wireless connection between the server and the vehicle and the expiration of the validity period during which the software is updatable occurs.

* * * * *